United States Patent
Yamaguchi

[19]

[11] Patent Number: 5,996,920
[45] Date of Patent: Dec. 7, 1999

[54] REMOVABLE SPOOL BRAKE DEVICE MOUNTED ON A SIDE PLATE IN A DOUBLE-BEARING TYPE FISHING REEL

[75] Inventor: Nobuyuki Yamaguchi, Tama, Japan

[73] Assignee: Daiwa Seiko, Inc., Tokyo, Japan

[21] Appl. No.: 09/160,241

[22] Filed: Sep. 25, 1998

[30] Foreign Application Priority Data

Sep. 25, 1997 [JP] Japan .................................. 9-276609

[51] Int. Cl.$^6$ .................................................. A01K 89/02
[52] U.S. Cl. ........................... 242/286; 242/288; 242/314
[58] Field of Search ................................... 242/286, 288, 242/289, 303, 312, 314

[56] References Cited

U.S. PATENT DOCUMENTS

| | | | |
|---|---|---|---|
| 4,390,140 | 6/1983 | Karlsson et al. | 242/312 X |
| 4,585,183 | 4/1986 | Puryear | 242/288 |
| 4,830,308 | 5/1989 | Puryear | 242/288 |
| 5,273,235 | 12/1993 | Sato | 242/288 |
| 5,362,011 | 11/1994 | Sato | 242/289 |
| 5,372,324 | 12/1994 | Sato | 242/289 X |
| 5,556,048 | 9/1996 | Hashimoto | 242/288 |

FOREIGN PATENT DOCUMENTS

6-86469  12/1994  Japan .

*Primary Examiner*—Donald P. Walsh
*Assistant Examiner*—Emmanuel M. Marcelo
*Attorney, Agent, or Firm*—Liniak, Berenato, Longacre & White

[57] ABSTRACT

In a spool brake device for a double-bearing type fishing reel, a plurality of removal preventive flange portions provided at regular intervals in the outer peripheral portion of an annular brake member including a brake part for the present spool brake device are disposed opposed to portions existing midway between a plurality of engaging portions which are respectively formed in a side plate, and the removal preventive flange portions are rotated by an operation part and are thus engaged with the engaging portions in a removal preventive manner to thereby mount the annular brake member into the side plate. Also, an engaging uneven portion is formed in the inner periphery of one of the annular brake member and side plate, while an elastically engaging member elastically engageable with the engaging uneven portion is provided in the other, whereby the moderation of rotation due to elastic resistance is applied to the annular brake member in the rotation direction thereof to thereby be able to ensure the control of the brake force.

6 Claims, 12 Drawing Sheets

REMOVABLE SPOOL BRAKE DEVICE MOUNTED ON A SIDE PLATE IN A DOUBLE-BEARING TYPE FISHING REEL

BACKGROUND OF THE INVENTION

1. Field of the Invention

The present invention relates to an improved spool brake device which is incorporated in a double-bearing type fishing reel in order to prevent the backlash of the fishing reel which could be caused by the over-rotation of a spool when a fishing line is played out.

2. Description of the Related Art

Conventionally, in a spool brake device to prevent the backlash of a double-bearing type fishing reel, generally, an annular brake member of the spool brake device disposed within one of side plates of a reel main body is rotated or moved in the axial direction thereof to thereby control the brake force of the annular brake member by operating a control knob which is disposed outside the side plate. However, in the structure that the control knob is exposed and projected outside the above side plate of the reel main body, there are found two main drawbacks: that is, the gripping function of the reel main body can be deteriorated, and the fishing line can be entangled around the exposed and projected control knob. As means for improving these drawbacks, as disclosed in Japanese Utility Model Publication No. 6-86469 of Heisei, there is known a method in which an annular brake member of a magnetic brake device is held and fixed between the side plate of a reel main body and a frame and the side plate is mounted and removed to thereby rotate and control the annular brake member, so that the brake force of the annular brake member can be controlled.

However, in the above-mentioned conventional brake force controlling method, since the annular brake member is mounted and held between the side plate and frame, when removing the side plate to thereby control the brake force of the annular brake member, the annular brake member is easy to drop down and, at the same time, operations to position and fix the annular brake member when controlling the brake force there of are also troublesome so that the efficiency of the brake force controlling operation is poor. Also, because, when rotating the annular brake member to thereby position the same, the engaged state of the annular brake member with the side plate must be removed each time the annular brake member is rotationally operated, the brake force control operation cannot be carried out quickly and smoothly, the sense of control moderation cannot be obtained in the brake force control operation, and the degree of precision can be lowered in the brake force control operation. Further, to shift the annular brake member in position in the radial direction or in the axial direction thereof to thereby control the brake force thereof, it is necessary that a space for shifting the annular brake member is secured within the side plate, which increases the size of the side plate accordingly.

SUMMARY OF THE INVENTION

Accordingly, it is an object of the invention to provide a double-bearing type fishing reel which not only can improve the drawbacks found in the above-mentioned conventional brake force control method based on the mounting and removal of the side plate, but also permits easy and smooth execution of a brake force control operation.

In attaining the above object, according to the invention, there is provided, in a double-bearing type fishing reel in which a spool is rotatably supported between the two side plates of a reel main body and a spool brake device for braking the rotation of the spool is disposed in the interior portion of one of the two side plates, the spool brake device comprising: a plurality of removal preventive securing flanges provided at regular intervals in the outer peripheral portion of an annular brake member including a brake part of the present spool brake device, and an operation portion provided in the spool side end portion of the annular brake member; a plurality of securing portions formed in the above side plate, in which the annular brake member is removably and rotatably mounted, in such a manner that they are respectively so disposed as to be opposed to portions midway between the removal preventive securing flanges and can be engaged with the removal preventive securing flanges due to rotation of the annular brake member; and, an engaging uneven portion formed in one of the mutually opposed circumferential portions of the annular brake member and the above side plate, and an elastically engaging member provided in the other and engageable with the engaging uneven portion, whereby, in a state in which the removal preventive securing flanges are respectively in engagement with their associated securing portions, the elastically engaging member can be elastically engaged with the engaging uneven portion to thereby apply rotation resistance to the annular brake member in the rotation direction thereof. When the engaging uneven portion is formed in the above side plate, the elastically engaging member is provided in the annular brake member; and, on the other hand, when the engaging uneven portion is formed in the annular brake member, the elastically engaging member is provided in the above side plate. Also, the brake device according to the invention can apply not only to a magnetic brake device but also to a centrifugal brake device. In the latter case, the magnetic brake part of the former may be replaced with the frictional brake part of the latter. Further, according to the invention, in order to prevent the elastically engaging member from operating elastically on the above side plate or annular brake member when incorporating the annular brake member into the above side plate, if the non-operation recessed portion for prevention of the elastic operation is formed in the outside portion of one end of the above-mentioned engaging uneven portion, then the annular brake member can be removably mounted into the above side plate with little resistance in the axial direction and also, due to the rotational operation that is executed thereafter, not only the engaging operation of the annular brake member but also the engaging operation between the elastically engaging member and engaging uneven portion can be carried out smoothly, thereby being able to facilitate the incorporating operation of the annular brake member.

The present disclosure relates to the subject matter contained in Japanese patent application No. Hei. 9-276609 (filed on Sep. 27, 1997) which is expressly incorporated herein by reference in its entirety.

DETAILED DESCRIPTION OF THE EMBODIMENTS OF THE INVENTION

Now, description will be given below of the embodiments of a spool brake device according to the invention with reference to the accompanying drawings. At first, FIGS. 1 to 7 respectively show a first embodiment of the invention in which a magnetic brake device is used as the spool brake device. In particular, between two side plates 1 and 2 provided in a reel main body of a double-bearing type fishing reel, there is rotatably supported a spool shaft 4 including a spool 3 thereon. The spool shaft 4, as known well, is connected to a handle shaft 5 through a drive gear mechanism 5' and a clutch mechanism 4'. By operating a clutch mechanism operation part 4", the spool shaft 4 can be connected directly to the handle shaft 5 to thereby take up a fishing line, or the spool shaft 4 can be rotatably supported to thereby play out the fishing line. And, to the portion of the spool shaft 4 that is located on the side plate 2 side, there is fixed an annular conductive member 8 in such a manner that it is opposed to the outside surface of a magnet brake part 7 provided in the outer peripheral portion of a bearing part 6 of the side plate 2.

Also, in the reel side plate 2, at the outer peripheral position of the annular conductive member 8, there is disposed an annular brake member 9 in such a manner that it can be removably mounted onto the reel side plate 2 from the axial direction thereof and can be then rotated. In particular, in the inner peripheral portion of the annular brake member 9, there is disposed a brake part 10 consisting of a magnet which is disposed opposed to the annular conductive member 8; in the outer peripheral portion of the annular brake member 9, there are disposed a plurality of removal preventive securing flanges 11; on the outer end face of the annular brake member 9 that is located on the spool 3 side, there is disposed an operation part 12 which consists of a group of projections for easy rotational operation; and, in the inner end portion of the annular brake member 9, there is mounted, through a projecting hole 14 and an engaging hole 14', an elastically engaging member 13 which consists of a partially broken circular-ring-shaped spring including an engaging projecting portion 13'.

Figure 1:
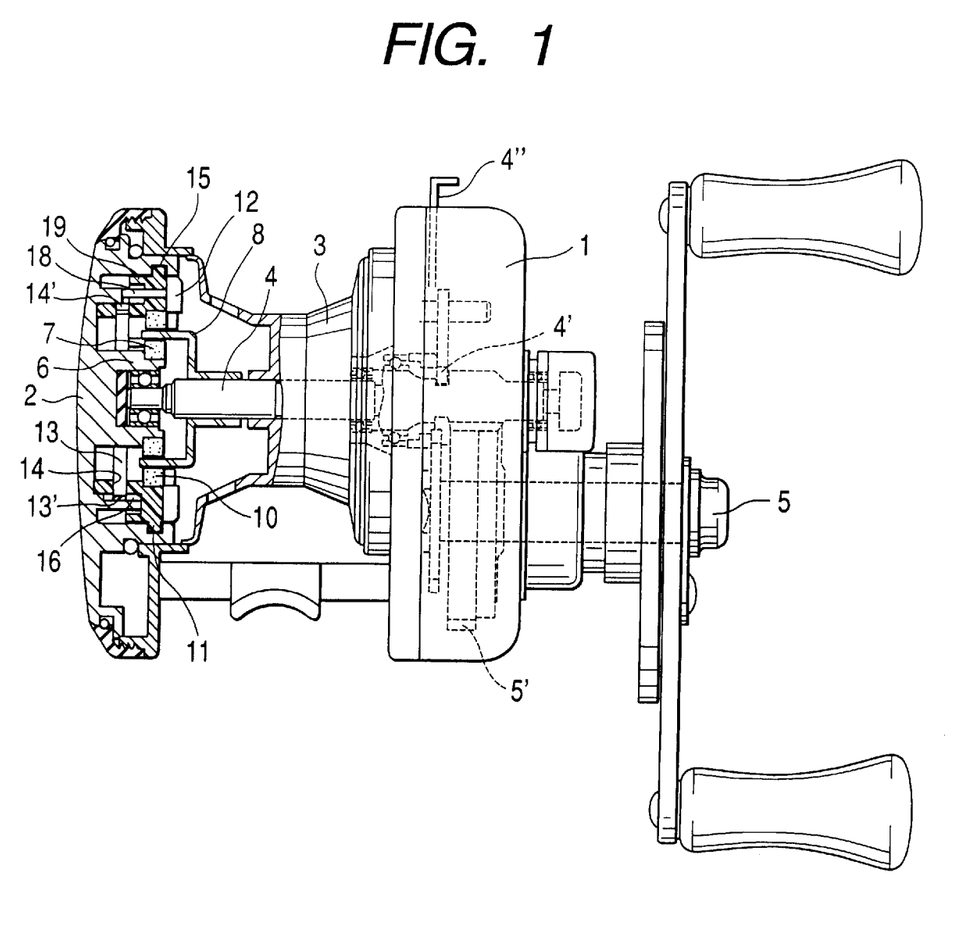
FIG. 1 is a partially cutaway front view of a first embodiment of a spool brake device according to the invention.
Figure 2:
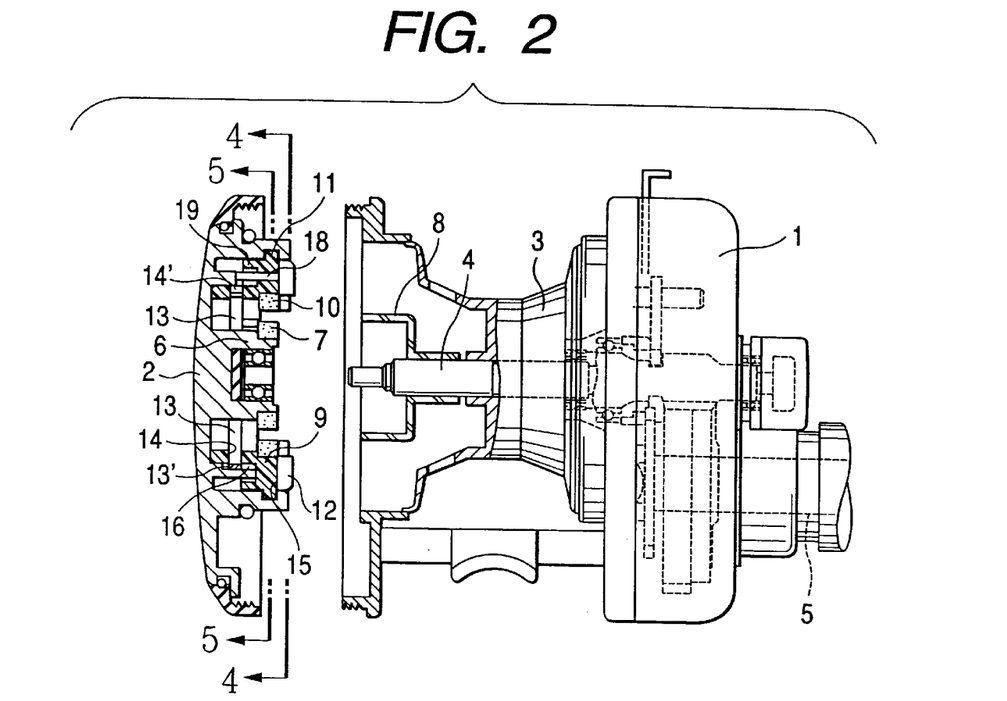
FIG. 2 is a partially cutaway front view of the first embodiment, showing a state thereof in which a side plate is separated therefrom.
Figure 3:
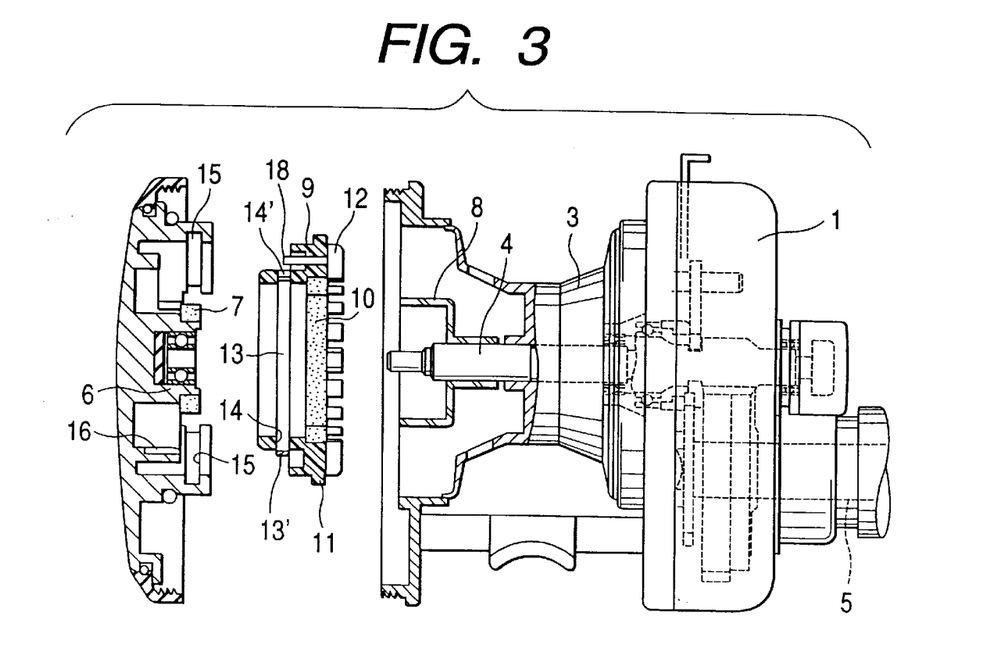
FIG. 3 is a partially cutaway front view of the first embodiment, showing a state thereof in which an annular brake member is exploded.
Figure 4:
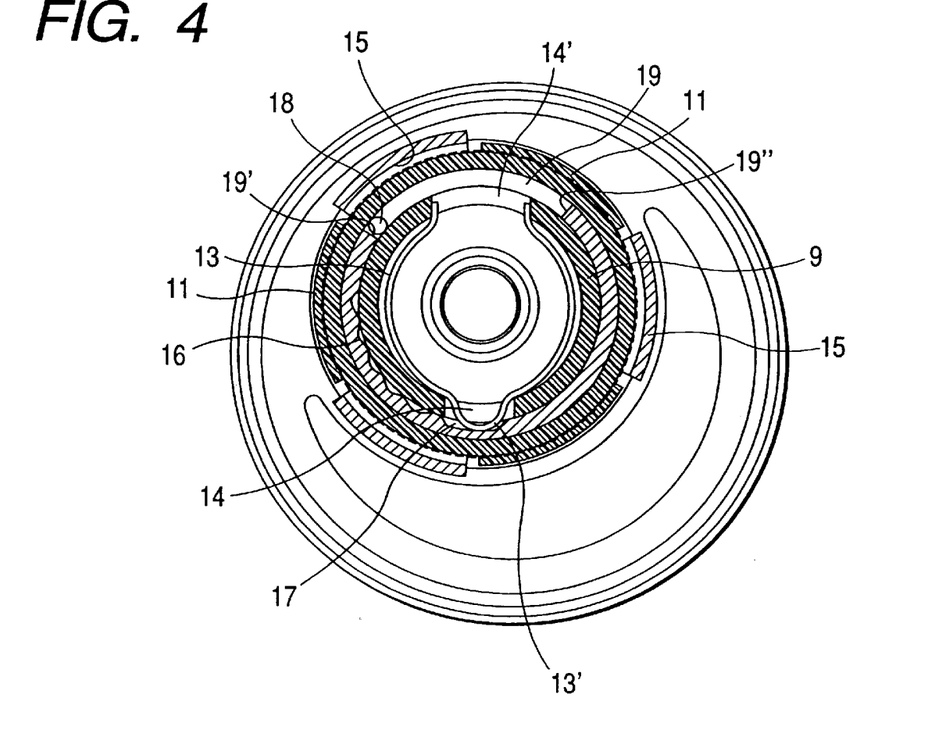
FIG. 4 is a section view taken along the line A—A shown in FIG. 2, showing a state in which the annular brake member is incorporated into the side plate.
Figure 5:
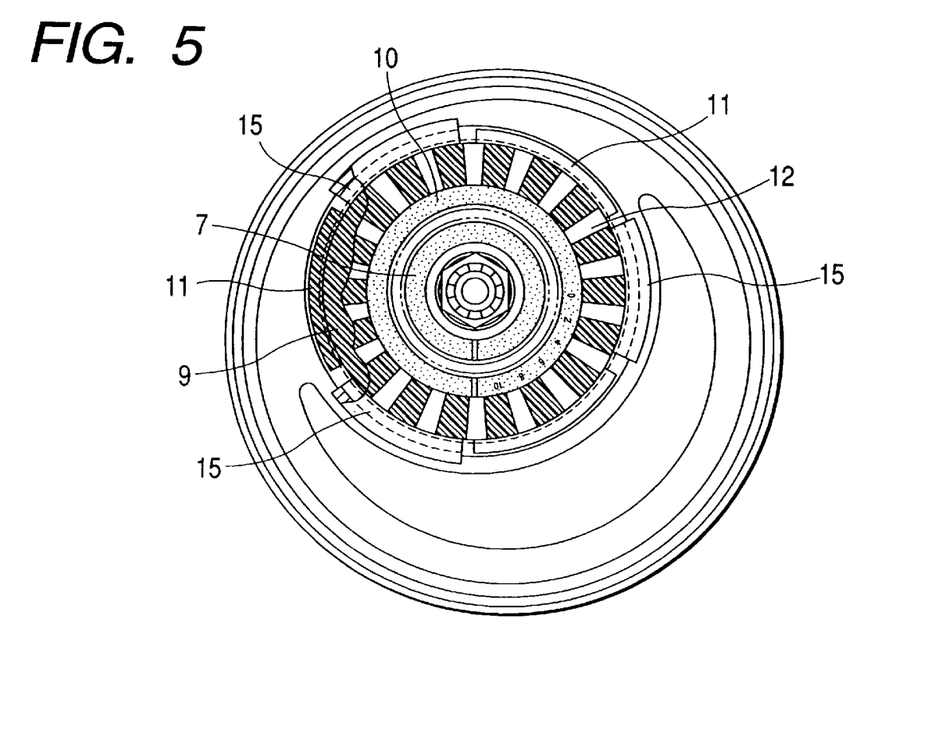
FIG. 5 is a section view taken along the line B—B shown in FIG. 2, showing a state in which the annular brake member is incorporated into the side plate.
Figure 6:
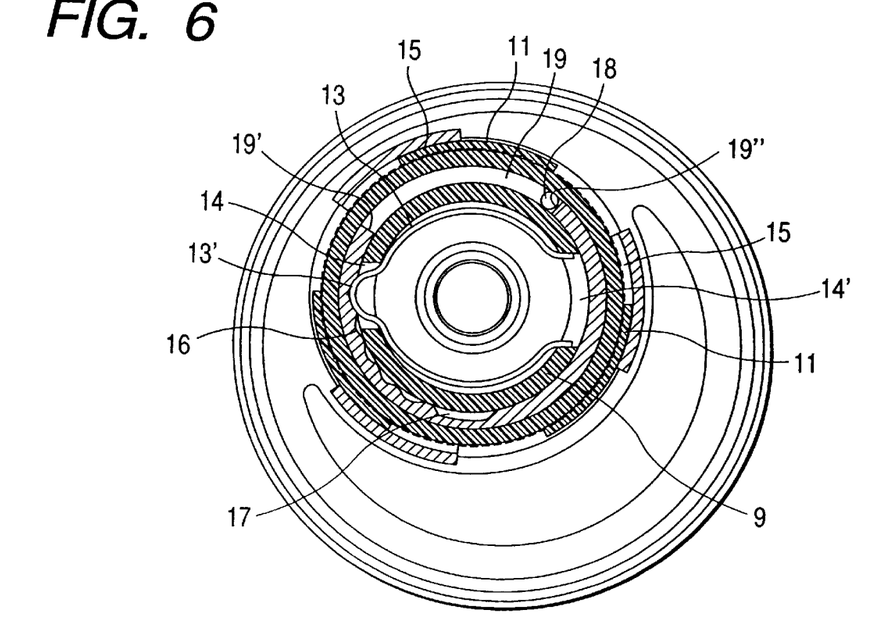
FIG. 6 is a section view taken along the line A—A shown in FIG. 2, showing a state in which the annular brake member is rotated.
Figure 7:
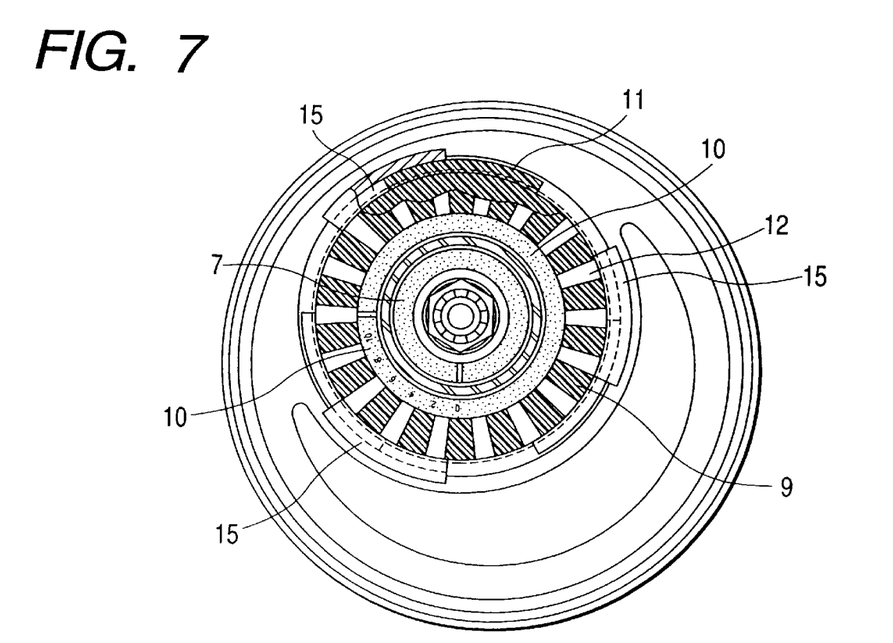
FIG. 7 is a section view taken along the line B—B shown in FIG. 2, showing a state in which the annular brake member is rotated.

In the side plate 2 around the outer peripheral portion of the annular brake member 9, there are formed a plurality of groove-shaped securing portions 15 which are spaced from one another at the same interval as the distance between the removal preventive securing flanges 11 and to which the removal preventive securing flanges 11 can be secured respectively; in particular, at positions where the removal preventive securing flanges 11 are opposed to but are not yet matched to the present securing portions 15, after the annular brake member 9 is fittingly mounted into the side plate 2 from the axial direction thereof, if the annular brake member 9 is rotated, then the removal preventive securing flanges 11 can be matched and secured to the securing portions 15. Also, in the side plate 2, there are formed an engaging uneven portion 16 to which the engaging projecting portion 13' of the spring engaging member 13 can be elastically engaged, and a non-operation recessed portion 17 which is so formed as to adjoin the outside portion of one end of the engaging uneven portion 16 and is used to store therein the engaging projecting portion 13' to thereby be able to prevent the engaging projecting portion 13' from carrying out any elastic operation. Further, in the side plate 2, there is formed a restrict groove 19 into which a rotation restrict pin 18 provided in the annular brake member 9 can be fitted. In particular, as shown in FIG. 4, when the rotation restrict pin 18 of the annular brake member 9 is situated at the left end 19' of the restrict groove 19 of the side plate 2, not only the removal preventive securing flanges 11 are positioned in portions existing midway between the securing portions 15 to thereby allow the annular brake member 9 to be mounted and removed from the axial direction of the spool shaft, but also the engaging projecting portion 13' of the elastically engaging member 13 is in engagement with the non-operation recessed portion 17. From this state, if the annular brake member 9 is rotated clockwise, then the removal preventive securing flanges 11 of the annular brake member 9 start to be engaged with the securing portions 15 of the side plate 2 and, at the same time, the engaging projecting portions 13' of the elastically engaging member 13 is elastically engaged with the engaging uneven portion 16 while carrying out a click operation, so that, as shown in FIG. 6, the rotation restrict pin 18 can be rotated until it reaches the right end 19" of the restrict groove 19.

That is, this rotational operation of the annular brake member 9 changes the mutually opposing positions between the brake part 10 of the annular brake member 9 and the magnet brake part 7 installed outside the bearing part 6 to thereby be able to control a brake force to be applied to the conductive member 8 of the spool shaft 4.

As described above, in the first embodiment of the invention, if the annular brake member 9 is fittingly mounted into the side plate 2 and is thereafter rotated, then the removal preventive securing flanges 11 of the annular brake member 9 are engaged with the securing portions 15 of the side plate 2 and, at the same time, the engaging projecting portions 13' of the elastically engaging member 13 is elastically engaged with the engaging uneven portion 16 while carrying out a click operation; and, in accordance with the rotation angle of the annular brake member 9, the brake part 10 is shifted in position with respect to the magnet brake part 7 provided in the bearing part 6, thereby controlling, that is, increasing or decreasing the brake force to be applied to the spool shaft 4 through the conductive member 8. And, when incorporating the annular brake member 9 into the side plate 2, the engaging projecting portion 13' of the elastically engaging member 13 is engaged with the non-operation recessed portion 17 and is thus prevented against any elastic operation to thereby be able to execute the incorporating operation of the annular brake member 9 from the axial direction thereof into the side plate 2 smoothly with no resistance. Thanks to the elastic engagement of the spring engaging member 13 with the engaging uneven portion 16 through the rotational operation of the annular brake member 6 executed after the incorporating operation thereof, the annular brake member 9 can be mounted positively with no possibility of its slippage and, at the same time, the sense of moderation can be given to the brake force control amount.

Figure 8:
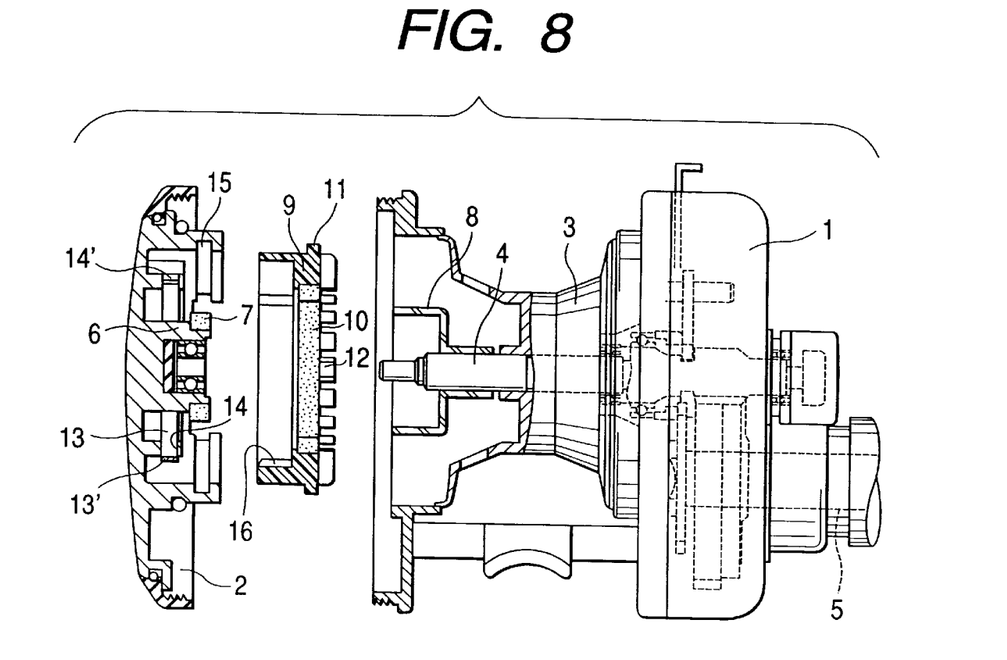
FIG. 8 is a partially cutaway front view of a second embodiment of a spool brake device according to the invention, showing a state thereof in which an annular brake member is exploded.
Figure 9:
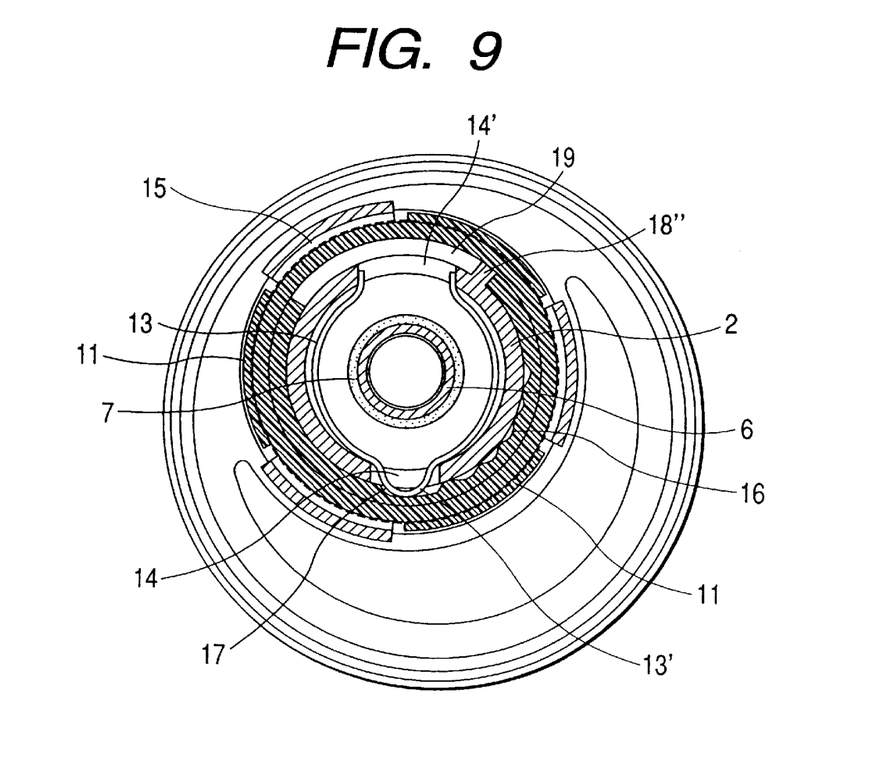
FIG. 9 is a section view of the second embodiment, showing a state thereof in which the annular brake member is incorporated into the side plate.
Figure 10:
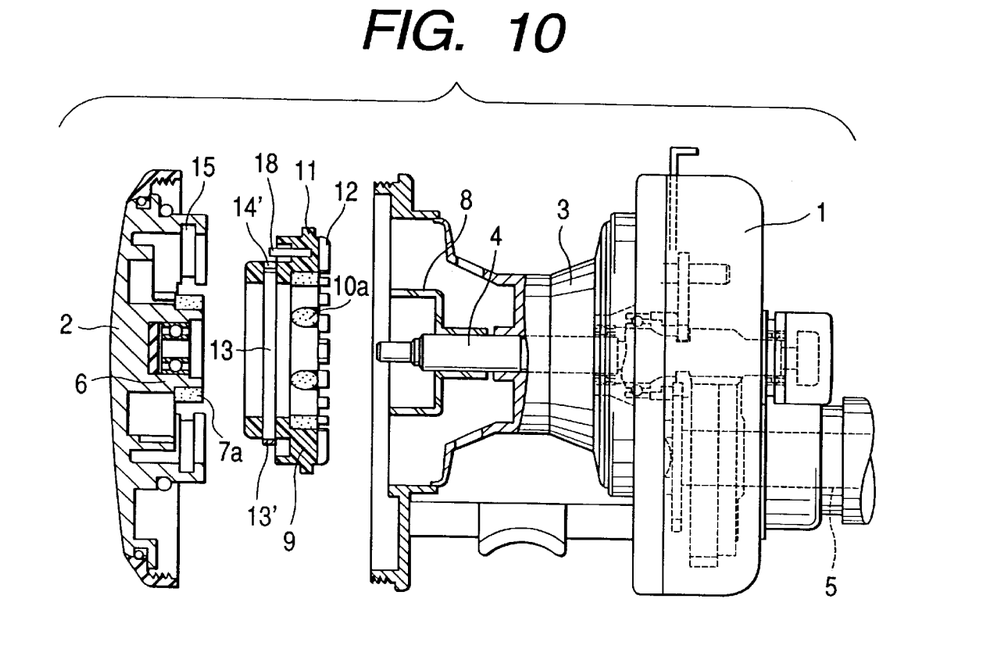
FIG. 10 is a partially cutaway front view of a third embodiment of a spool brake device according to the invention, showing a state thereof in which an annular brake member is exploded.
Figure 11:
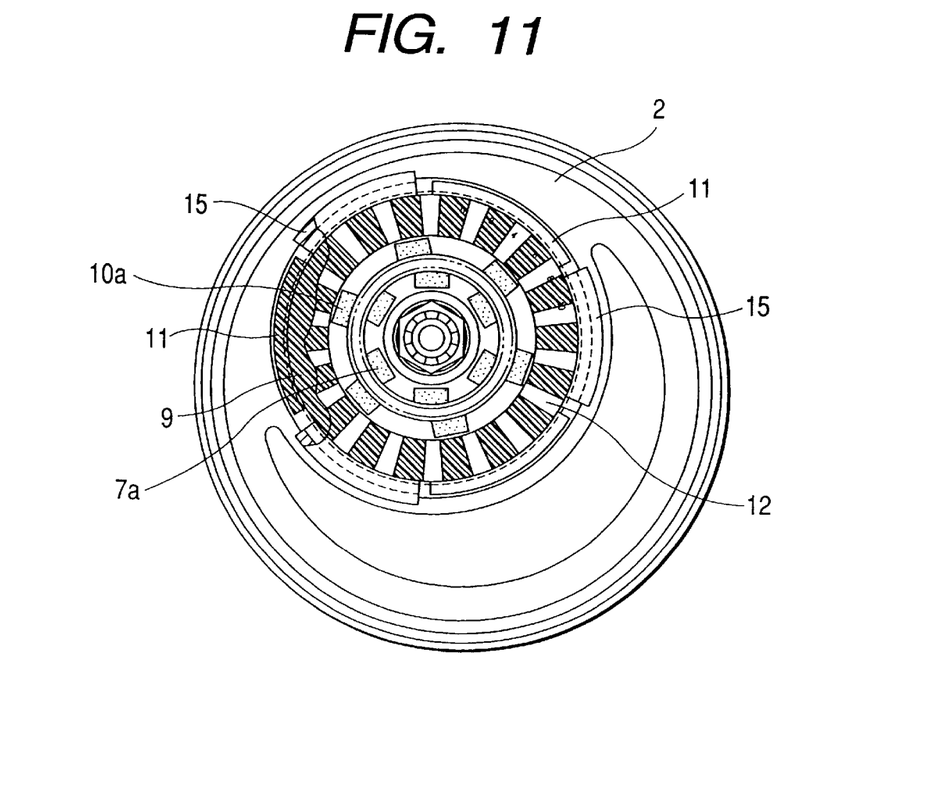
FIG. 11 is a section view of the third embodiment, showing a state thereof in which the annular brake member is incorporated into the side plate.

Next, referring to a second embodiment of a spool brake device according to the invention shown in FIGS. 8 and 9, the elastically engaging member 13 is mounted on the side plate 2 and, in the annular brake member 9, there is formed an engaging uneven portion 16 with which the engaging projecting portion 13' of the elastically engaging member 13 can be elastically engaged. A non-operation portion 17 is also formed in the annular brake member 9. As the rotation restrict means of the annular brake member 9, there is formed a restrict groove 19 in the annular brake member 9 and there is provided a rotation restrict projection 18' in the side plate 2, respectively. Referring further to a third embodiment of a spool brake device according to the invention shown in FIGS. 10 and 11, in the previously described first embodiment, the brake part 10 of the annular brake member 9 and the magnet brake part 7 of the bearing part are respectively replaced with a plurality of disk-shaped magnets 10a, 7a.

Figure 12:
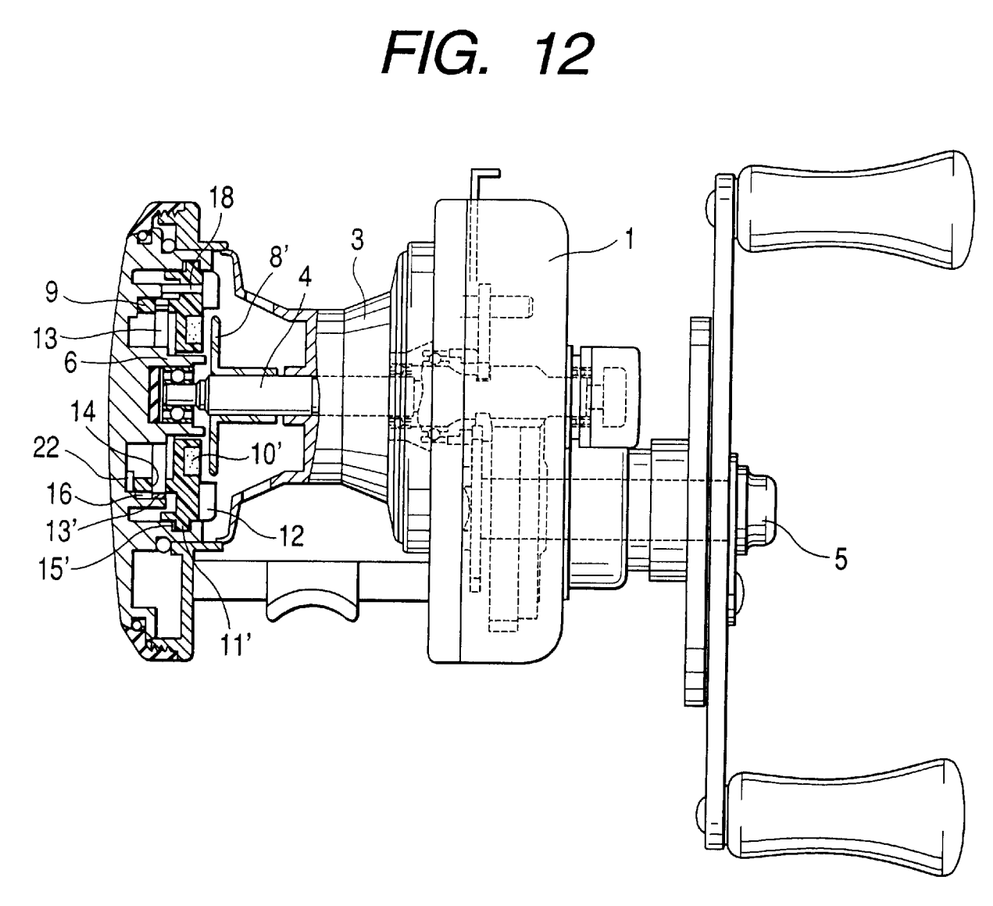
FIG. 12 is a partially cutaway front view of a fourth embodiment of a spool brake device according to the invention.
Figure 13:
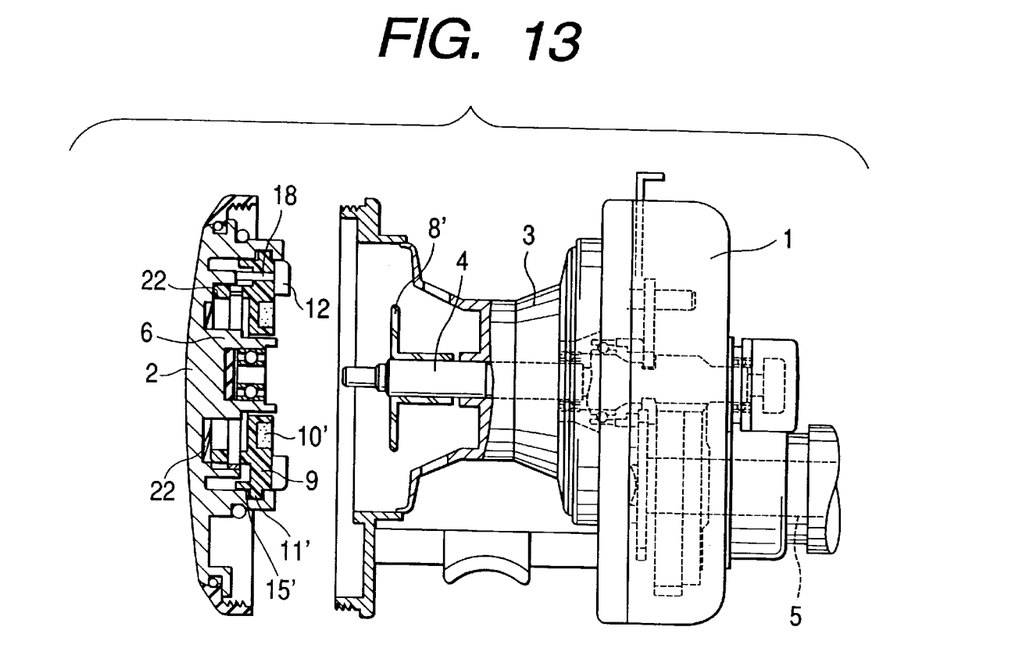
FIG. 13 is a partially cutaway front view of the fourth embodiment, showing a state thereof in which a side plate is separated therefrom.
Figure 14:
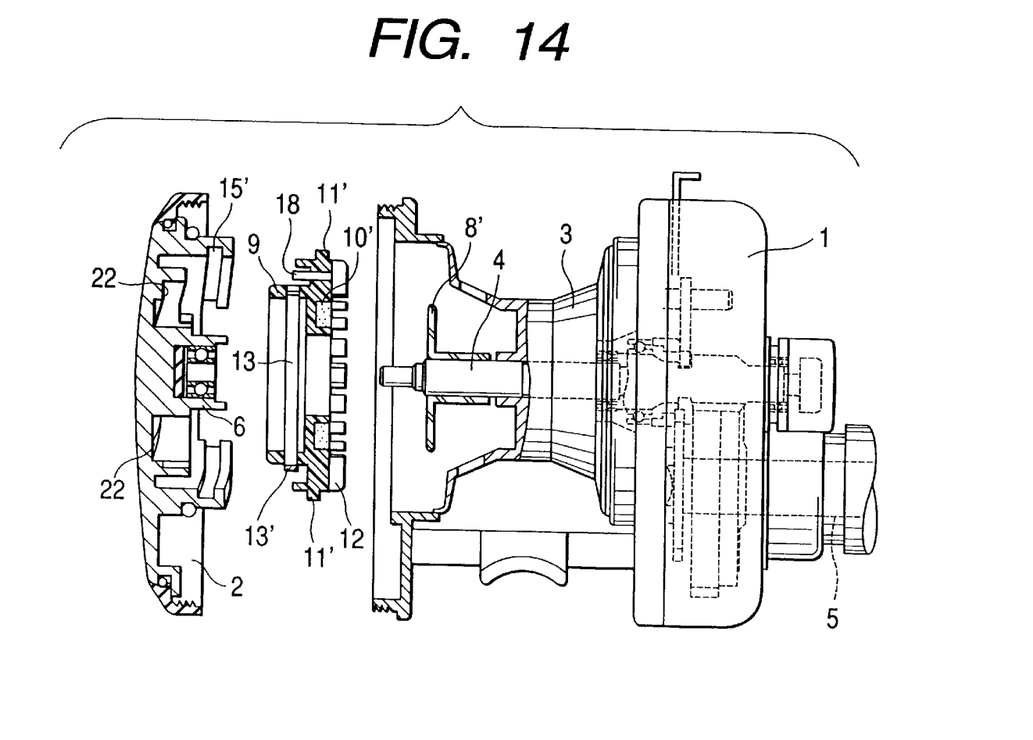
FIG. 14 is a partially cutaway front view of the fourth embodiment, showing a state thereof in which an annular brake member is exploded.
Figure 15:
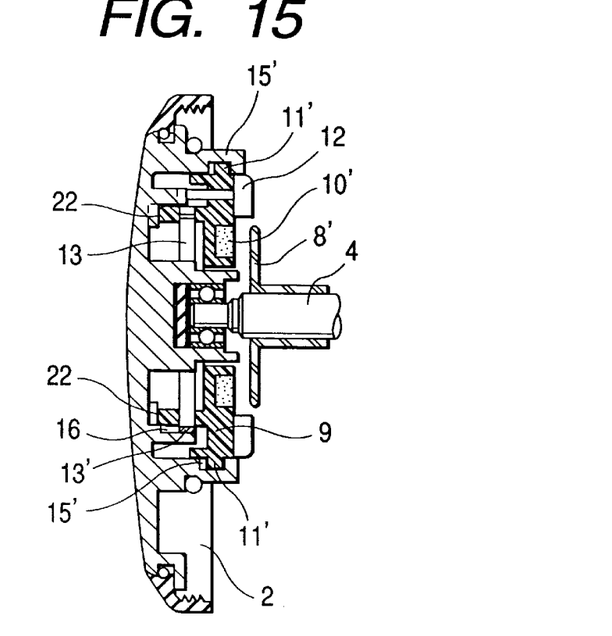
FIG. 15 is a longitudinal front view of the fourth embodiment, showing a state thereof in which the annular brake member is rotated.
Figure 16:
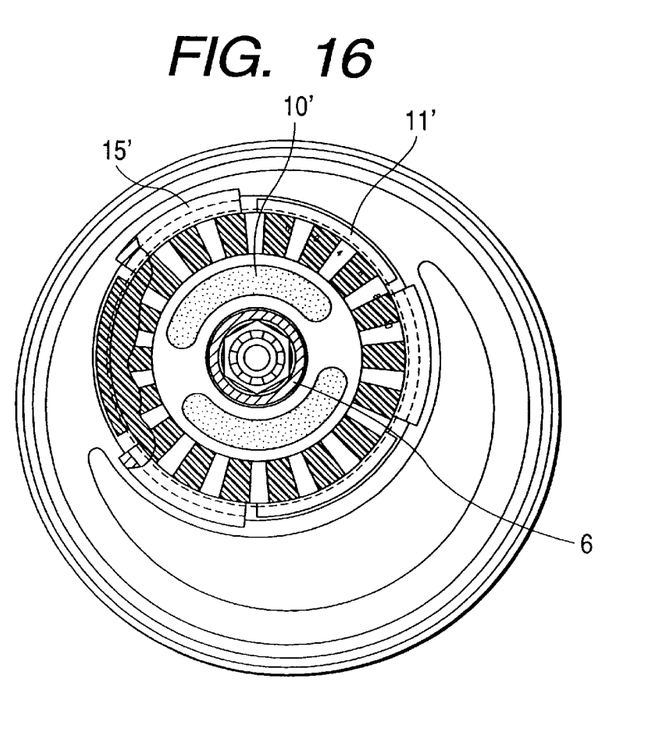
FIG. 16 is a side view of the fourth embodiment, showing a state thereof in which the annular brake member is incorporated into the side plate.
Figure 17:
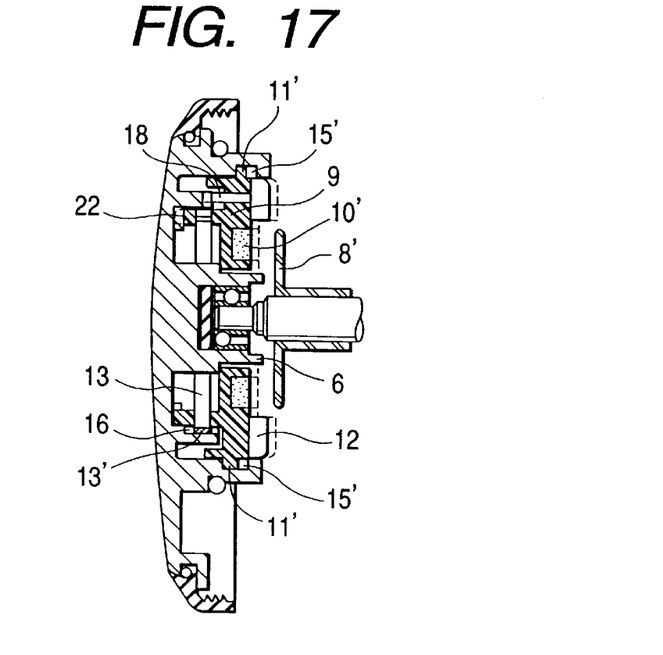
FIG. 17 is a longitudinal front view of the fourth embodiment, showing a state thereof in which the annular brake member shown in FIG. 15 is rotated further.
Figure 18:
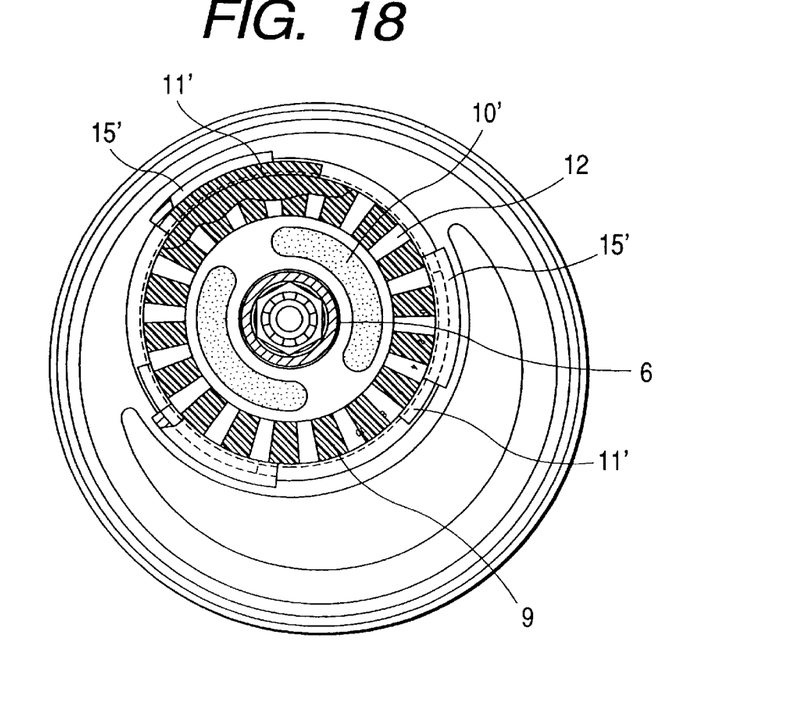
FIG. 18 is a side view of FIG. 17.

And, in a fourth embodiment of a spool brake device according to the invention shown in FIGS. 12 and 18, as control means for controlling the brake force, the annular brake member 9 is changed from the rotational control technique as in the previously described embodiments to a different control technique in which the annular brake member 9 is moved back and forth in the spool shaft direction to thereby control the brake force of the annular brake member 9. Also, in the fourth embodiment, instead of the annular conductive member 8 used in the first embodiment, a disk-shaped conductive member 8' is fixedly secured to the spool shaft 4, while the removal preventive securing flanges 11' of the annular brake member 9 and the securing portion 15' of the side plate 2 are respectively formed in an inclined manner; and, the annular brake member 9 is structured such that, due to the inclined cam operation of the securing portions 15', it is allowed to advance and retreat in the axial direction thereof while rotating and only the magnets provided in the brake part 10' are disposed opposed to the disk-shaped conductive member 8', whereby the brake force can be controlled by controlling the distance by which they are opposingly spaced from each other.

Figure 19:
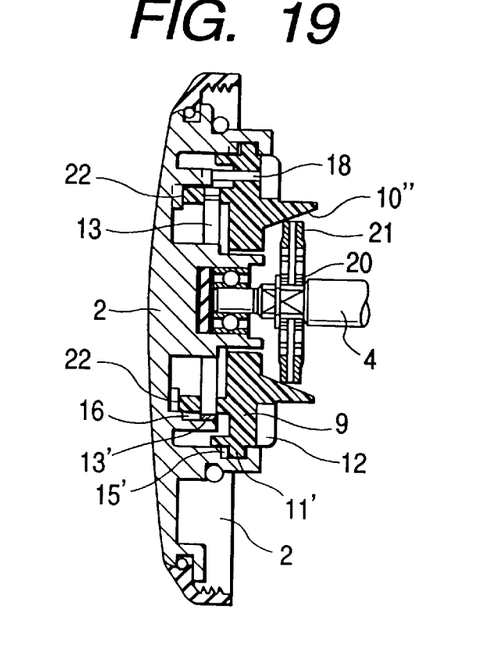
FIG. 19 is a longitudinal front view of a fifth embodiment of a spool brake device according to the invention, showing a state thereof in which an annular brake member is rotated.
Figure 20:
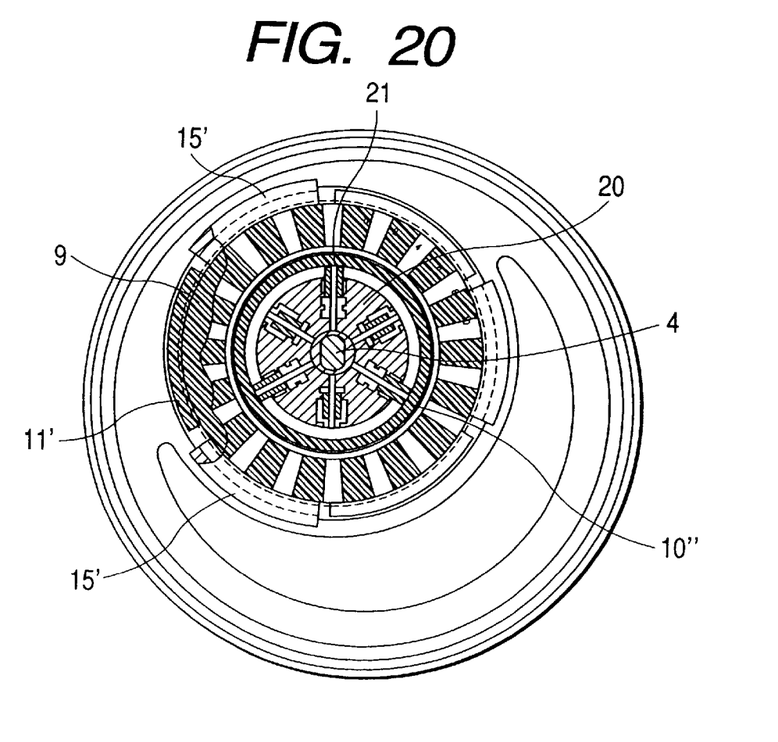
FIG. 20 is a side view of the fifth embodiment, showing a state thereof in which the annular brake member is incorporated into the side plate.
Figure 21:
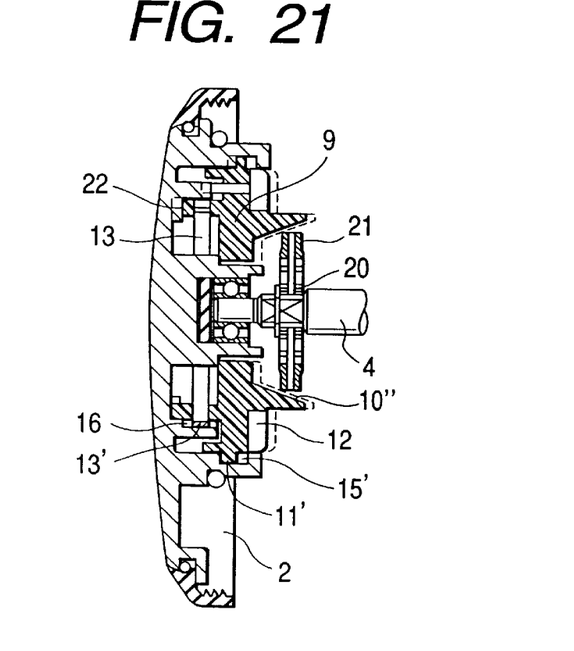
FIG. 21 is a longitudinal front view of the fifth embodiment, showing a state thereof in which the annular brake member shown in FIG. 19 is rotated further; and, FIG. 22 is a side view of FIG. 21.
Figure 22:
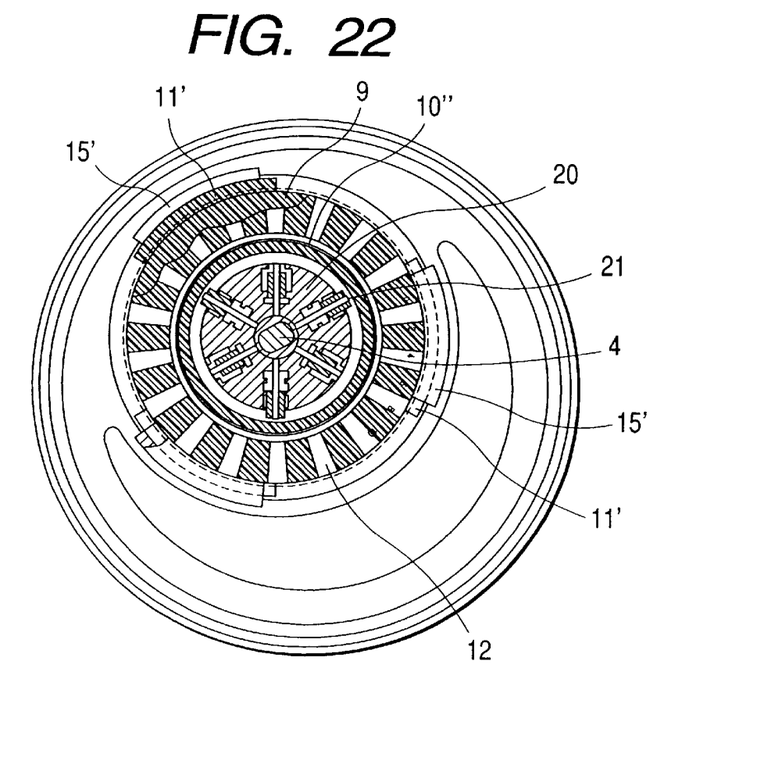

Now, referring to a fifth embodiment of a spool brake device according to the invention shown in FIGS. 19 and 22, there is employed brake force control means using a centrifugal force. In particular, similarly to the fourth embodiment, the annular brake member 9 is structured such that not only is it allowed to advance and retreat in the spool shaft direction due to the cam operation of the inclined removal preventive securing flanges 11' thereof engaged with the inclined securing portions 15' of the side plate 2, but also the friction brake part 10" thereof is formed in a truncated conical recess-like shape which gradually reduces in the inside diameter thereof, whereby the brake force of the brake device can be controlled in accordance with the butting position of a centrifugal collar 21, which is supported in a radially movable manner on a centrifugal collar hold member 20 fixed to the spool shaft 4, with respect to the brake part 10" of the annular brake member 9. By the way, in FIGS. 19 to 22, reference character 22 designates an inclined cam portion which is provided in the side plate 2 and is used to guide the annular brake member 9.

As has been described heretofore, according to the invention, since the brake force can be controlled in a state that the annular brake member at the spool brake position is united into the side plate and is thereby fitted and held in the side plate with no possibility of slippage, differently from the conventional spool brake device in which the annular brake member can slip off when it is removed from the side plate, the brake control operation can be executed smoothly and easily and also the rotation control operation of the annular brake member can be carried out with the sense of moderation, so that the brake force can be controlled to a required amount accurately.

Also, according to the invention, when the annular brake member is incorporated into the side plate from the axial direction thereof, the elastically engaging member capable of applying the sense of moderation to the rotational operation is engaged with and positioned at the non-operation recessed portion and is thereby prevented from executing any elastic operation. Thanks to this, the annular brake member can be fitted and mounted into the side plate from the axial direction thereof easily with little resistance and also can be rotated thereafter; that is, not only the annular brake member including both of the removal preventive mechanism and moderation sense applying mechanism can be incorporated into the side plate smoothly and efficiently, but also the structure of the annular brake member can be simplified.

Further, according to the invention, the annular brake member is structured such that not only the brake part thereof can be used in either of a magnetic brake system or a centrifugal force brake system but also the control operation thereof can be carried out easily by means of the rotational operation of the operation part thereof. Therefore, the spool brake device including such annular brake member can be used in a wide application range as a spool brake device for a double-bearing type fishing reel.

What is claimed is:

1. In a double-bearing type fishing reel in which a spool is rotatably supported between two side plates of a reel main body and a spool brake device for braking rotation of said spool is disposed in an interior portion of one of said two side plates, said spool brake device comprising:

an annular brake member including:
 a brake part;
 a plurality of removal preventive securing flanges provided at regular intervals in an outer peripheral portion of said annular brake member; and
 an operation portion provided in a spool side end portion of said annular brake member;

a plurality of securing portions formed in said side plate, said securing portions being respectively insertable into spaces between said removal preventive securing flanges, and rotatable relative to said removal preventive securing flanges for engagement with said removable preventive securing flanges;

an engaging uneven portion having recesses provided in one of mutually opposed circumferential portions of said annular brake member and said side plate, and an elastically engaging member provided in the other of said mutually opposed circumferential portions for engagement with said engaging uneven portion;

wherein, in a state in which said removal preventive securing flanges are respectively in engagement with said securing portions, said elastically engaging member is elastically engaged with said engaging uneven portion to apply resistance to rotation of said annular brake member relative to said side plate.

2. A spool brake device in a double-bearing type fishing reel as set forth in claim 1, wherein a non-operation recessed portion to prevent said elastically engaging member against its elastic operation is formed in an outside portion of one end of said engaging uneven portion, and, when mounting and removing said annular brake member, said elastically engaging member is engaged with said non-operation recessed portion.

3. A spool brake device in a double-bearing type fishing reel as set forth in claim 1, wherein said engaging uneven portion is provided in said side plate and said elastically engaging member is provided in said annular brake member.

4. A spool brake device in a double-bearing type fishing reel as set forth in claim 1, wherein said engaging uneven portion is provided in said annular brake member and said elastically engaging member is provided in said side plate.

5. A spool brake device in a double-bearing type fishing reel as set forth in claim 1, wherein said brake part of said annular brake member is formed as a magnetic brake part of a magnetic brake device.

6. A spool brake device in a double-bearing type fishing reel as set forth in claim 1, wherein said brake part of said annular brake member is formed as a friction brake part disposed in a centrifugal brake device.

* * * * *